United States Patent [19]
Brown

[11] 3,889,381
[45] June 17, 1975

[54] GAGE FOR MEASURING THE CIRCUMFERENTIAL EXPANSION OF INTERNALLY PRESSURIZED TUBES

[75] Inventor: Bruce B. Brown, Latham, N.Y.

[73] Assignee: The United States of America as represented by the Secretary of the Army, Washington, D.C.

[22] Filed: Apr. 10, 1974

[21] Appl. No.: 459,767

[52] U.S. Cl. .............................. 33/179; 33/178 E
[51] Int. Cl. ............................................ G01b 5/08
[58] Field of Search ............... 33/179, 178 E; 73/16

[56] References Cited
UNITED STATES PATENTS

| | | | |
|---|---|---|---|
| 2,637,907 | 5/1953 | Aubery et al. | 33/179 |
| 2,895,226 | 7/1959 | Coy | 33/179 |
| 3,314,156 | 4/1967 | Van Burkleo | 33/179 |

Primary Examiner—Richard E. Aegerter
Assistant Examiner—Charles E. Phillips
Attorney, Agent, or Firm—Robert P. Gibson; Nathan Edelburg

[57] ABSTRACT

A gage for measuring the circumferential expansion of a tube subjected to internal pressure comprises a chain of roller links between first and second rectangular blocks respectively mounted in slidable engagement with spaced parallel rods projecting from the opposite ends of a fixed reference block. When the gage is wrapped around the circumference of the tube and the first block advanced relative to the second, the initial slack in the chain is taken up. Further movement of the first block toward the reference block will impart simultaneous movement to the second block thereby compressing a pair of springs in abutment therewith in order to insure that the subsequent gaging separation between the first and second blocks will start with the same degree of tautness in the chain regardless of the circumference of the tube. A measuring device is adjustably fixed to the second block and includes a spring-biased slidable plunger protruding therefrom into contact with the end of a micrometer spindle fixed to the reference block. The gage can be easily and accurately calibrated simply by actuating the first block through the same distance as the anticipated circumferential expansion of the tube and periodically comparing the increase in the gap between the second block and the reference block with the readings provided by the measuring device.

7 Claims, 4 Drawing Figures

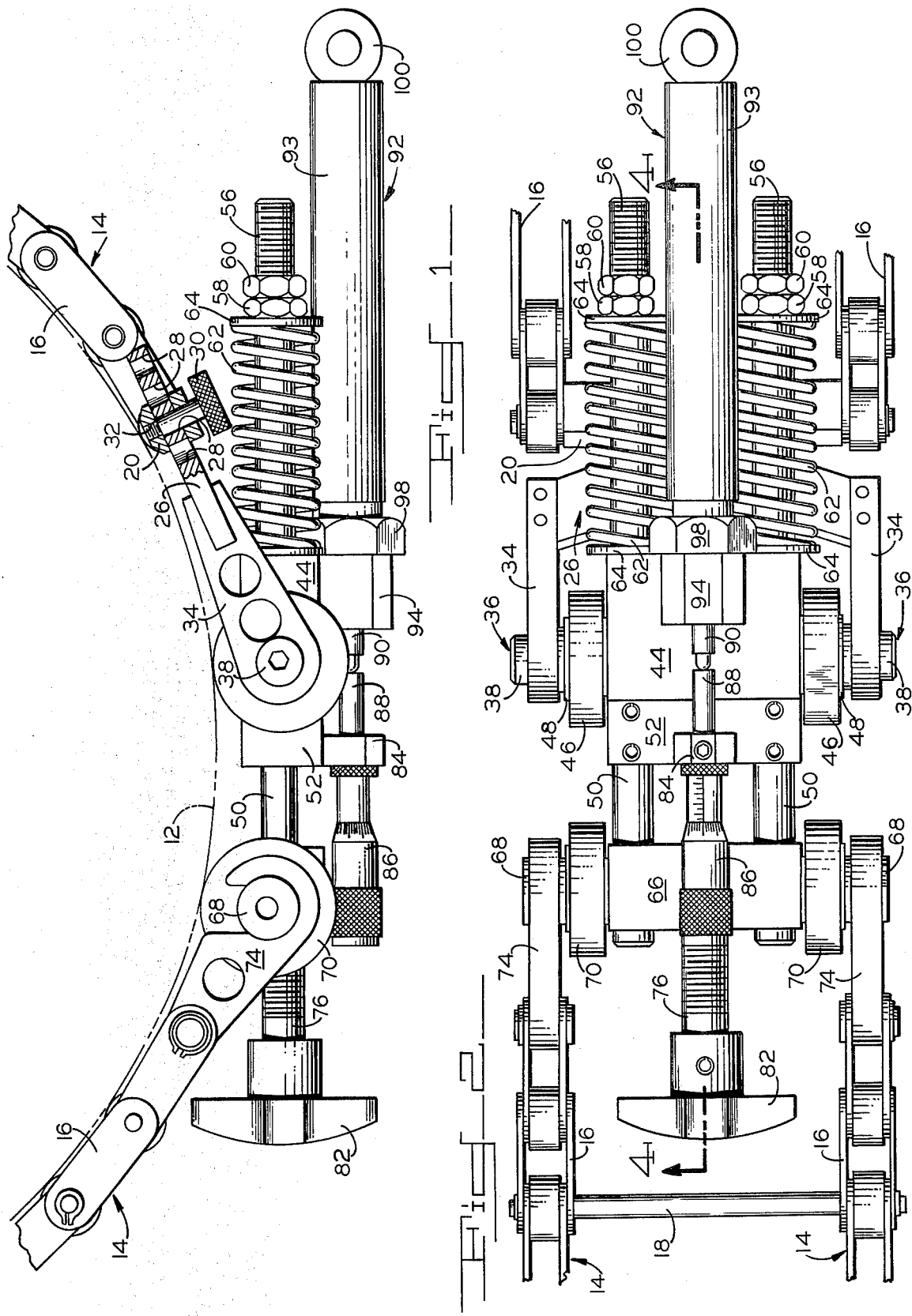

GAGE FOR MEASURING THE CIRCUMFERENTIAL EXPANSION OF INTERNALLY PRESSURIZED TUBES

BACKGROUND OF THE INVENTION

This invention relates to means for determining the circumferential expansion of a tubular member and is more particularly directed to a gage for measuring such expansion during the application of pressure to the interior bore surface of a large caliber gun tube.

In the manufacture of large caliber gun tubes, the interior bore surface thereof is ordinarily hydraulically stressed beyond the yield strength of the metal to thereby induce residual stresses in the walls of the tube which tend to counteract the stresses normally imparted thereto during the subsequent firing thereof. This process, known as autofrettage, serves to increase the endurance and fatigue life of the gun tube. In order to prevent the tube from being overstressed, it is essential that the circumferential expansion thereof in response to the internal pressure be limited to a predetermined extent dependent on the size and the type of steel utilized therein. This has been accomplished in the past by attaching strain gages to the exterior surface of the tube at a plurality of selected locations and monitoring each gage during the stressing of the tube. While such procedure will provide the desired information concerning the stresses being imparted to the tube, the number of strain gages which must be employed and the proper emplacement on the exterior of the tube is a time-consuming procedure requiring a high degree of skill and knowledge on the part of the operator.

Accordingly, it is an object of this invention to provide a simple and inexpensive gage which can be readily utilized at any given point on the exterior of a gun tube to continuously measure the circumferential expansion thereof at that point.

It is a further object of the present invention to provide a gage of the aforesaid type which can be readily adjusted to fit around the circumference of all types and sizes of large caliber gun tubes.

Another object of this invention lies in the provision of a gage, as aforesaid, which can be readily set to the same initial loading for each gun tube to be autofrettaged despite the dimensional variations usually encountered in the circumferences of large caliber gun tubes and in the gage itself during the tensioning thereof.

A still further object of this invention is to provide a gage, as aforesaid, which can be precisely calibrated throughout the entire operating range thereof under exactly the same conditions as those encountered during the actual circumferential expansion of the gun tube.

It is also an object of this invention to provide a gage, as aforesaid, which can be directly installed in gaging position at any given point along a relatively long gun tube without the need for any preliminary movement from an end of the tube to such given point.

SUMMARY OF THE INVENTION

It has been found that the foregoing objects can best be accomplished by a gage comprising a pair of elongated rods fixedly retained in a reference block so as to extend from opposite faces thereof in spaced parallel relation. A slackadjusting block is slidably mounted on the rods on one side of the reference block while a spring-loading block is similarly mounted on the rods on the other side of the reference block. The rods extend beyond the spring-loading block to support a corresponding pair of compression springs arranged to urge the loading block toward the reference block. A measuring device provided with a spring-biased slidable plunger is mounted on the spring-loading block to protrude therebeyond into contact with the gaging spindle of a standard micrometer fixed to the reference block. The other end of the plunger is associated with means responsive to the slidable movement thereof as, for example, a linear variable differential transducer connected to a digital recorder. A flexible chain of roller links is detachably connected at one end thereof to the slack-adjusting block while the opposite end of the chain is fastened to the spring-loading block through an adjusting yoke arranged to minimize the initial amount of slack in the chain when fitted around the gun tube. An actuating screw is threaded into the slack-adjusting block and extends therebeyond to terminate in rotatable engagement within the reference block.

Thus, when the roller chain is fitted around the gun tube and the free end thereof attached to the slack-adjusting block, rotation of the actuating screw will advance such block toward the reference block to thereby take up the remaining slack in the chain. Thereafter, any further advance imparted to the slack-adjusting block by the actuating screw will transfer sufficient force through the taut chain to overcome the resistance of the compression springs and impart corresponding movement to the spring-loading block away from the reference block. Such movement of the spring-loading block is continued until the gap relative to the reference block reaches a predetermined distance as measured by the response of the differential transducer to the increase in the protrusion therefrom of the slidable plunger. If it is desired to check the calibration of the gage for accuracy over the operating range anticipated for the particular size of the gun tube being gaged, this can be readily accomplished simply by setting the micrometer to the desired distance, then returning the latter to the zero position thereof, and checking the digital recorder to ascertain whether the reading thereof has also returned to zero. If not, the necessary correspondence between the micrometer and the digital recorder can be attained by adjusting the differential transducer to change the protrusion therefrom of the spring-biased plunger. The gage is now ready to measure the additional movement of the spring-loading block relative to the reference block during the circumferential expansion imparted to the gun tube by the autofrettage of the interior bore surface thereof.

BRIEF DESCRIPTION OF THE DRAWING

The exact nature of the invention as well as other objects and advantages thereof will be readily apparent from consideration of the following specification relating to the annexed drawings, wherein:

FIG. 1 is a plan view of the connecting structure between the ends of the roller chain surrounding the exterior periphery of a vertically disposed tubular member immediately prior to the desired preloading of the compression springs;

FIG. 2 is an elevational view of the structure shown in FIG. 1;

DESCRIPTION OF A PREFERRED EMBODIMENT

Figure 3:
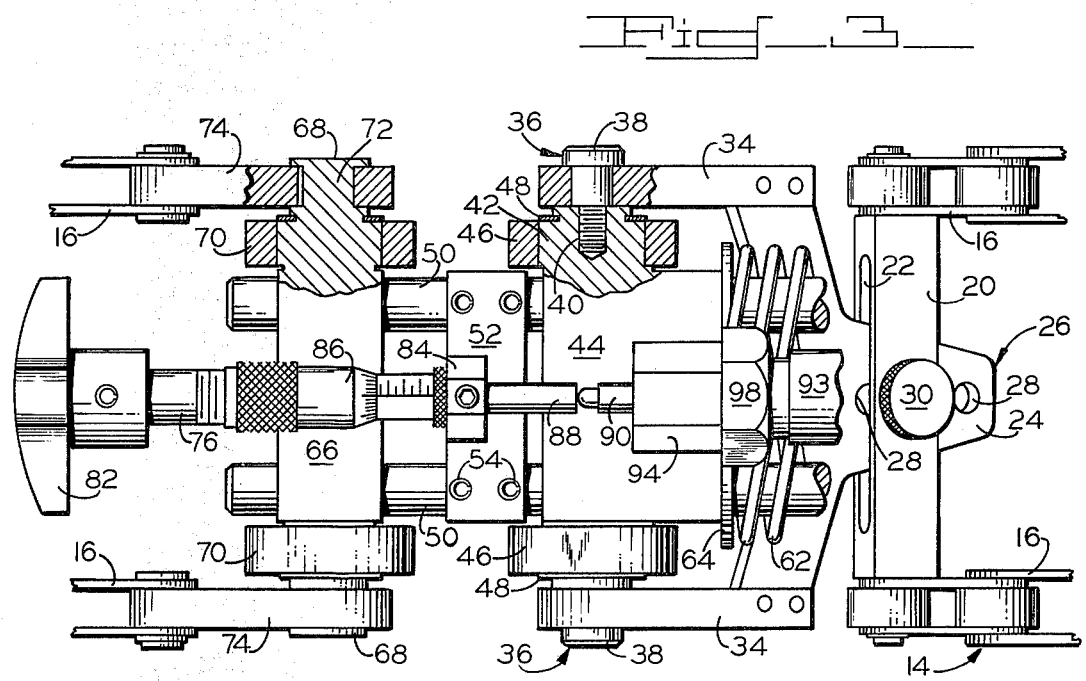
FIG. 3 is a view similar to that of FIG. 2 but partially cut away in several places to show the internal structural detail thereof, the movable blocks being shown in the position attained subsequent to the preloading of the compression springs but prior to any circumferential expansion of the tubular member.

Referring now to FIG. 1 of the drawings, the expansion gage of the present invention is designed to be fitted around the circumference of a vertically disposed tubular member 12 as, for example, a large caliber gun tube of the type wherein the interior bore surface is customarily autofrettaged to improve the subsequent firing life thereof. The gage includes a flexible chain belt 14 formed by a spaced apart double row of roller links 16 pivotally interconnected in end-to-end relation and transversely joined by cross-bars 18 positioned at spaced intervals along the length of the belt 14. One end of belt 14 terminates in a rectangular connector 20 having a central slot 22 therethrough, as best shown in FIG. 3, for receiving the elongated end 24 of an adjusting yoke 26. Yoke end 24 is provided with a plurality of spaced adjusting holes 28 selectively engageable with a knurled locking screw 30 passing downwardly through connector 20 into threadable engagement with a tapped hole 32 in the underside thereof. The opposite end of adjusting yoke 26 terminates in a pair of spaced arms 34 extending therefrom into respective pivotal engagement with a corresponding pair of bolts 36. Each bolt 36 is provided with an enlarged head 38 and, as best shown at 40 in FIG. 3, is threaded into the outer end of a stud 42 projecting integrally from or otherwise fixedly secured to each of the opposite sides of a rectangular block 44. Each stud 42 also serves to rotatably mount a roller bearing 46 thereon which is retained in place by a snap ring 48.

Figure 4:
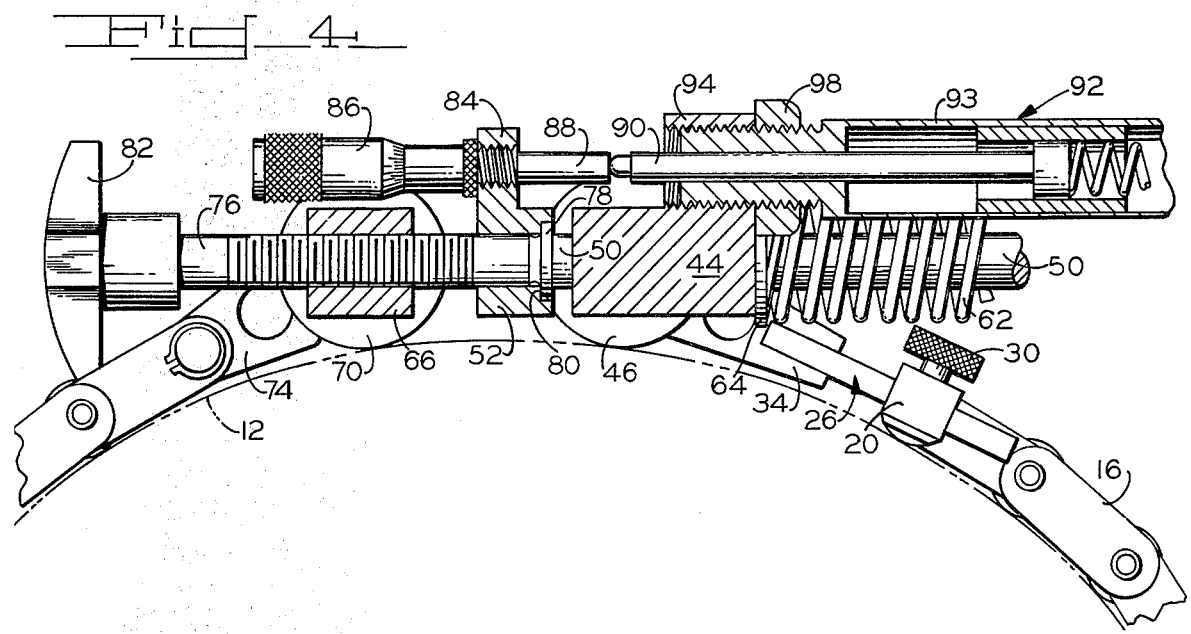
FIG. 4 is a sectional view taken along line 4—4 of FIG. 2 but with the movable blocks in the position shown in FIG. 3.

Block 44 is slidably mounted on a pair of elongated rods 50 which extend from a rectangular reference block 52 and are fixed thereto in spaced parallel relation by suitable roll pins 54. Rods 50 continue beyond block 44 to terminate in threaded ends 56 each carrying an adjusting nut 58 and a locking nut 60 in adjacent relation. A compression spring 62 provided with a seating washer 64 at both ends thereof surrounds each rod 50 between block 44 and adjusting nut 58. Rods 50 also extend beyond the opposite face of reference block 52 into slidable engagement with a rectangular block 66 provided with a pair of studs 68 projecting from opposite sides thereof and arranged to rotatably mount roller bearings 70 thereon identical to bearings 46 in structure and function. The outer ends of studs 68 are formed as spool portions 72 which are arranged to be releasably engaged by hook-shaped members 74 pivotally secured to the corresponding end links 16 of chain belt 14. An actuating screw 76 extends centrally through block 66 in threaded engagement therewith to terminate in a flanged end 78 rotatably engageable in a mating counterbored recess 80 (FIG. 4) in reference block 52. The opposite end of screw 76 is provided with a knob 82 for imparting manual rotation thereto.

Reference block 52 is formed with an upwardly projecting boss 84 arranged to fixedly mount the barrel of a conventional micrometer 86 modified to provide an unobstructed spindle 88. Micrometer 86 is positioned so that spindle 88 projects beyond reference block 52 into contact with the end of a coaxially aligned spring-biased plunger 90 projecting from a measuring device 92 housed in a cylinder 93 which is, in turn, threaded at one end thereof into a fixed projection 94 on the upper surface of block 44. Measuring device 92 is preferably in the form of a linear variable differential transducer, hereinafter simply referred to as "transducer" which produces an electrical signal in accordance with the extent to which plunger 90 projects from cylinder 93. The depth to which transducer 92 is threaded into projection 94 is adjustable and once adjusted is arranged to be locked in such position by a nut 98. The output of transducer 92 is utilized to energize an indicating light 100 secured to the free end thereof for signaling the attainment of the desired gap between blocks 44 and 52. In addition, transducer 92 is interconnected with the controls of the system utilized to pressurize the interior of tubular member 12 and also serves to function a digital recorder (not shown). It should also be understood that measuring device 92 is not necessarily limited to the use of a differential transducer but may also include other forms of measuring means directly responsive to the linear movement of plunger 90 such as, for example, a dial type of bore gage.

In operation, the length of chain belt 14 is initially selected to surround the tubular member 12 being gaged with a minimum of slack and yet permit easy assembly of the hook-shaped members 74 to spool portions 72 of studs 68 in block 66. This is accomplished by first removing or adding the required number of roller links 16 to permit belt 14 to completely surround the circumference of member 12. The degree of slack in belt 14 can then be controlled by withdrawing locking screw 30 out of engagement with yoke end 24 and then repositioning yoke 26 relative to slotted connector 20 to permit re-engagement of screw 30 in the particular hole 28 which will provide the desired initial slack. Thereafter, actuating screw 76 is rotated to advance block 66 toward reference block 52 thereby taking up all the slack in chain belt 14. Once this is accomplished, further actuation of screw 76 will continue to advance block 66 in the same direction and in the absence of any slack in belt 14 will impart corresponding movement to block 44 away from reference block 52 and against the compression of springs 62. This simultaneous movement of blocks 66 and 44 is continued until the energization of light 100 indicates that the gap between the opposing faces of blocks 44 and 52 has reached the distance required to impart a given preload to compression springs 62. As a result, regardless of the dimensional variations in the circumferences of gun tubes of the same nominal bore diameter, the expansion imparted thereto during the autofrettage process will be initiated with the same preloading of springs 62 thereby insuring an extremely precise determination of the point at which the autofrettage process should be terminated. If it is desired to check the compression of springs 62 throughout the entire range anticipated during the actual autofrettage of member 12, this can be readily accomplished simply by continuing to rotate actuating screw 76 until the digital recorder reading has reached the maximum value to which member 12 should be circumferentially expanded. Any necessary adjustment of springs 62 can be accomplished by unloosening locking nuts 60 and then rotating adjusting nuts 58 to the desired extent.

It is important that the gage of the present invention include some provision for the calibration thereof to a given standard to assure that transducer 92, or any other measuring device utilized, produce accurate readings with a constant linearity of response. Accordingly, micrometer 86 is mounted so that the desired calibration checks will be taken in the same direction of travel as the gaging movement imparted to blocks 44 and 66 and can be made over the full range of measurement of transducer 92. In order to provide these calibration checks, micrometer 86 is initially set to the zero position thereof and knob 82 rotated to adjust the gap between blocks 44 and 52 to a predetermined distance. Lock nut 98 is then loosened and the position of transducer 92 relative to projection 94 adjusted until a zero reading is imparted to the digital recorder. Lock nut 98 is again tightened and micrometer 86 rotated to advance spindle 88 against plunger 90 throughout the anticipated gaging range during which the reading of micrometer 86 is periodically compared with that imparted to the digital recorder by transducer 92. In the event of any differences therebetween, transducer 92 is adjusted in the manner previously described. Once the calibration checks have been completed, the rotation of micrometer 86 is reversed to return spindle 88 to the zero position thereof at which point micrometer 86 is suitably locked against further rotation.

In some instances, as, for example, where a new gage is being checked for the first time or where some structural damage or extreme wear is suspected in an old gage, it may be desirable to check the calibration of transducer 92 under the same spring loading as that experienced during the actual movement imparted to the gaging elements by the circumferential expansion of a gun tube during autofrettage. This is accomplished by locking micrometer 86 at the zero setting thereof and thereafter rotating actuating screw 76 to move block 44 away from block 52 to the same extent as that required for the full operating range of the gage. Periodically, the gap between blocks 44 and 52 is measured by any suitable instrument such as a "feeler gage" and the distance compared to the reading imparted to the digital recorder by the travel of cylinder 93 relative to plunger 90.

Thus, there is here provided a simple and reliable gage for accurately measuring the circumferential expansion of a member such as a gun tube. The gage is readily adjustable to a large variety of gun tube sizes and can be easily converted from one size to another regardless of whether the difference therebetween is larger or smaller than the length of one of the roller links in the chain. In addition, the gage is uniquely designed to measure the circumferential expansion of a gun tube from a standard initial zero position regardless of the size of the tube thereby eliminating the inaccuracies ordinarily introduced by variations in the flexibility of the chain and in the dimensional tolerances of the circumference of the gun tube. Moreover, the gage is provided with a self-contained calibration means capable of easily checking the overall accuracy thereof under actual gaging conditions.

The foregoing disclosure and description of the invention is illustrative only. Various changes may be made within the scope of the appended claims without departing from the spirit of the invention.

I claim:

1. A gage for measuring the circumferential expansion of a tubular member subjected to internal stressing, comprising,
   a pair of rods transversely spaced in parallel relation,
   first and second blocks slidably mounted on said rods at spaced-apart locations thereon,
   a reference block having an adjustable reference surface thereon and fixedly mounted on said rods intermediate said first and second blocks,
   spring means mounted on said rods in position to normally urge said second block into mating contact with said reference block,
   a roller chain having the ends thereof respectively secured to said first and second blocks to permit circumferential engagement with the exterior periphery of the tubular member at any point along the length thereof,
   a measuring device having a housing secured to said second block in parallel alignment with said rods and a spring-biased plunger slidably disposed in said housing to extend therefrom into contact with said adjustable reference surface on said reference block, and
   an actuating screw threadably engaged in said first block to project therefrom into rotatable retention with said fixed reference block whereby clockwise rotation of said screw initially advances said first block toward said reference block to take up the slack in said roller chain and thereafter actuates said first block along said rods to transmit corresponding slidable movement to second block for compressing said spring means to impart a desired preload thereto prior to the operation of said measuring device in response to circumferential expansion of the tubular member.

2. The gage defined in claim 1 wherein said rods are provided with stop means on the ends thereof nearest said measuring device, said spring means comprises a compression spring surrounding each of said rods between said second block and said stop means, and said measuring device includes means associated therewith for visually indicating the attainment of said desired preload on said springs.

3. The gage defined in claim 1 wherein said adjustable reference surface on said reference block comprises a micrometer fixedly mounted thereon and having a projecting spindle disposed in axial contact with the end of said spring-biased plunger in said measuring device whereby changes in the dimensional setting of said micrometer can be compared with the corresponding output of said measuring device to calibrate the accuracy thereof.

4. A gage for measuring the circumferential expansion of a gun tube during the application of pressure to the bore thereof, comprising,
   a pair of rods disposed in transversely spaced parallel relation,
   first and second blocks slidably mounted on said rods in longitudinally spaced relation,
   a plurality of interconnected roller links forming a chain having the ends thereof respectively secured to said first and second blocks,
   means for adjusting said chain to fit around the exterior periphery of the gun tube at any point along the length thereof, a reference block fixedly mounted on said rods intermediate said first and second blocks, stop means on each of said rods located in spaced relation to said second block, a compression spring surrounding each of said rods and seated between said second block and said stop means, a micrometer fixedly mounted on said reference block and having a spindle extending therefrom in the direction of said second block, a spring-biased plunger slidably mounted on said second block in coaxial alignment with said micrometer spindle for contact with the free end thereof, means responsive to the displacement of said plunger relative to said second block during the slidable movement thereof on said rods for measuring the change in the separation of said second block from said reference block, and an actuating screw threadably secured in said first block to project therefrom into rotatable engagement with said reference block whereby clockwise rotation of said screw initially advances said first block to take up the slack in said chain and thereafter actuates said first block along said rods to impart corresponding slidable movement to said second block relative to said reference block for compressing said springs to a desired preload whereupon any subsequent circumferential expansion of the tubular member is automatically measured by the corresponding displacement of said springbiased plunger during the slidable movement of said second block.

5. The gage defined in claim 4 wherein the ends of said rods projecting from said second block are threaded and each of said stop means comprises, a washer in abutment with said compression spring at the end thereof remote from said second block, an adjusting nut adjacent said washer for controlling the initial compression of said spring, and a locking nut adjacent said adjusting nut for retention thereof in the adjusted position.

6. The gage defined in claim 4 wherein said means for measuring the change in the separation of said second block from said reference block comprises, a linear variable differential transducer adjustably secured to said second block in operative association with said spring-biased plunger, means for adjusting said transducer to provide a zero output thereof upon the attainment of the desired preload of said compression springs, and a visual indicator associated with said transducer for signaling the attainment of the desired preload of said compression springs.

7. The gage defined in claim 4 wherein said chain comprises, a double row of pivotally interconnected roller links, a cross-bar connecting said rows at spaced intervals along the length of said chain, a hook-shaped member secured to each of said roller links at one end of each of said rows, a connector transversely engageable between said roller links at the other end of said rows, a yoke disposed in adjustable engagement with said connector and having a pair of spaced arms extending into pivotal engagement with the opposite sides of said second block, and means for varying the length of said yoke to provide sufficient slack in said chain to enable said hook-shaped members to engage with said first block.

* * * * *